United States Patent [19]
Collins

[11] 3,965,795
[45] June 29, 1976

[54] BREECH CARTRIDGE REMOVER
[76] Inventor: Arthur Collins, 1395 Stardust No. 5, Reno, Nev. 89503
[22] Filed: Mar. 22, 1974
[21] Appl. No.: 453,870

[52] U.S. Cl. .............................. 89/1.5 F; 29/200 D; 29/427
[51] Int. Cl.² ...................... F41F 5/00; B23P 19/00
[58] Field of Search ................ 89/1.5, 33 B, 33 MC, 89/1.8; 42/1 M; 81/3.05; 124/11; 46/74 A, 74 B, 74 C; 273/96, 102, 102.4, 181 F, 184 R; 29/200 D, 427

[56] References Cited
UNITED STATES PATENTS
3,683,544   8/1972   Pippin ............................... 46/74 B
3,709,495   1/1973   Krombein ....................... 273/102 R
3,782,018   1/1974   Hancox ............................... 89/33 B FOREIGN PATENTS OR APPLICATIONS
563,930   11/1932   Germany ............................... 86/36

Primary Examiner—Samuel W. Engle
Assistant Examiner—S. A. Cangialosi
Attorney, Agent, or Firm—Huebner & Worrel

[57]   ABSTRACT

An expended cartridge remover for breech guns which employs the application of hydraulic pressure through the gun barrel in the direction opposite the travel of the explosive charge. The remover may be utilized upon the gun barrel removed from the bomb rack or may be adapted to operation on bomb racks where impulse cartridges are fired from breeches permanently incorporated in the bomb racks.

7 Claims, 11 Drawing Figures

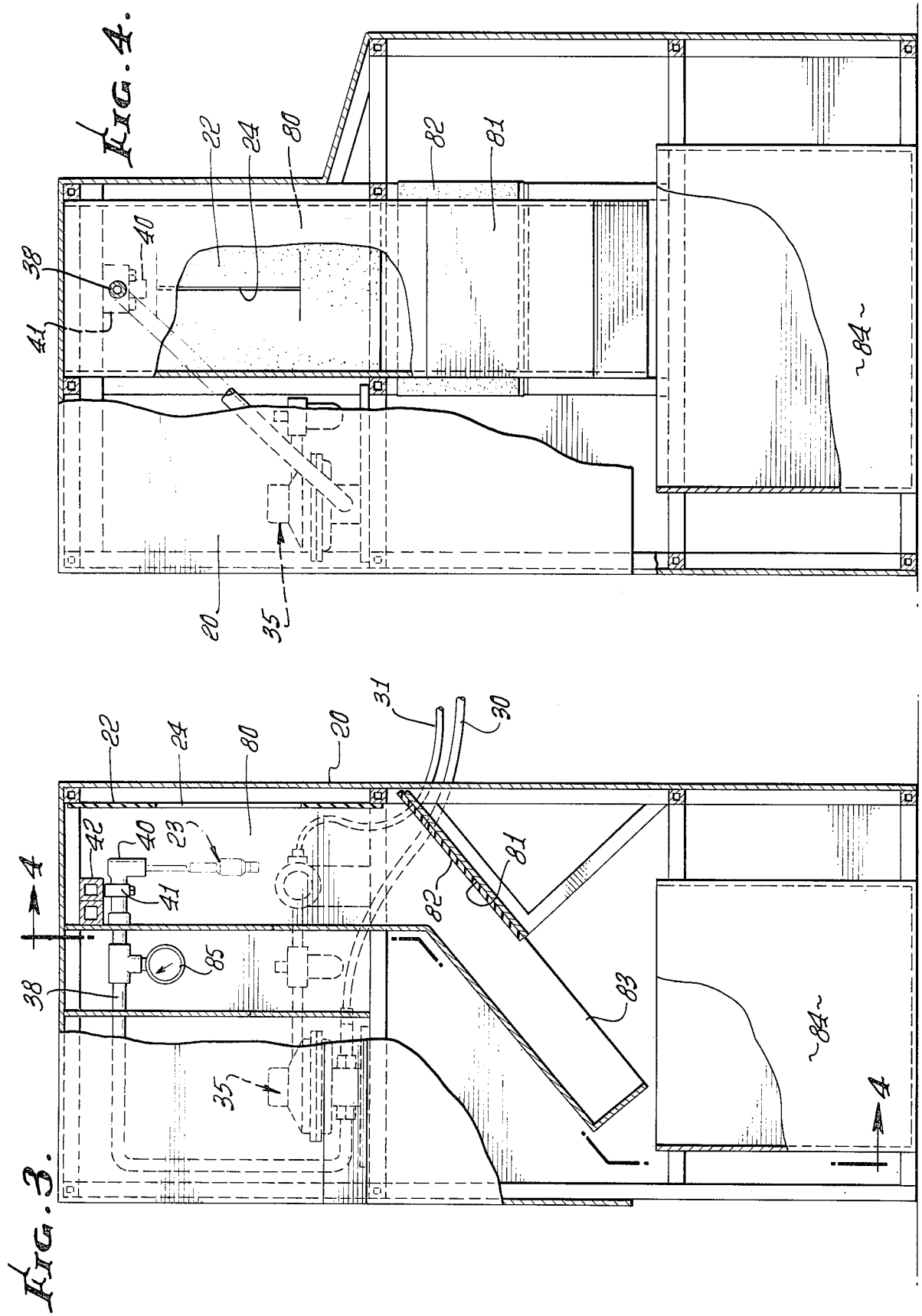

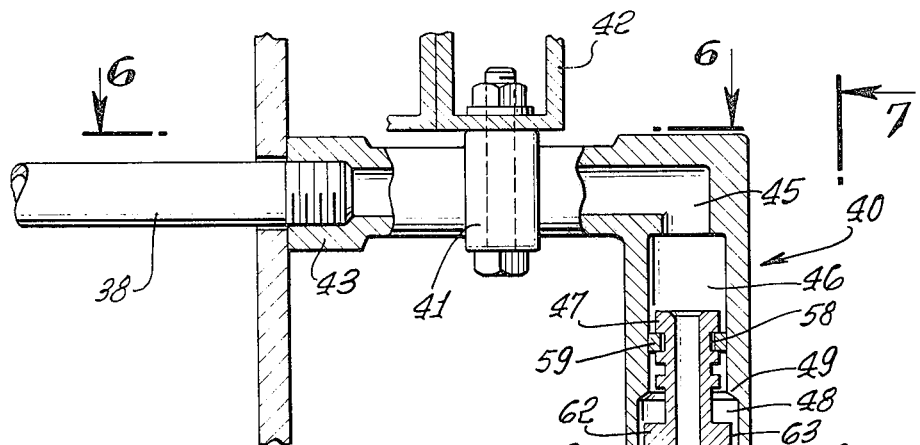
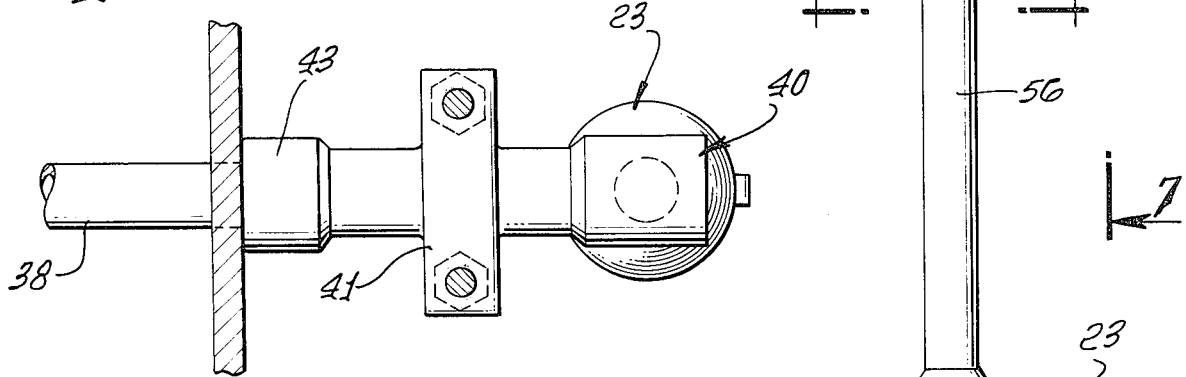
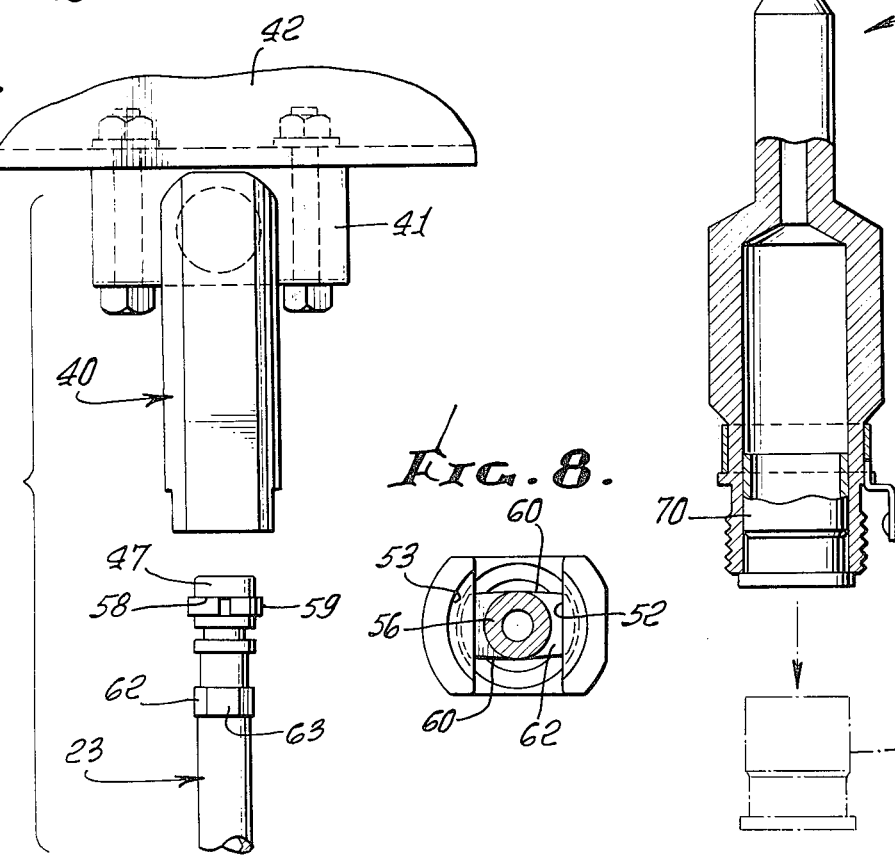

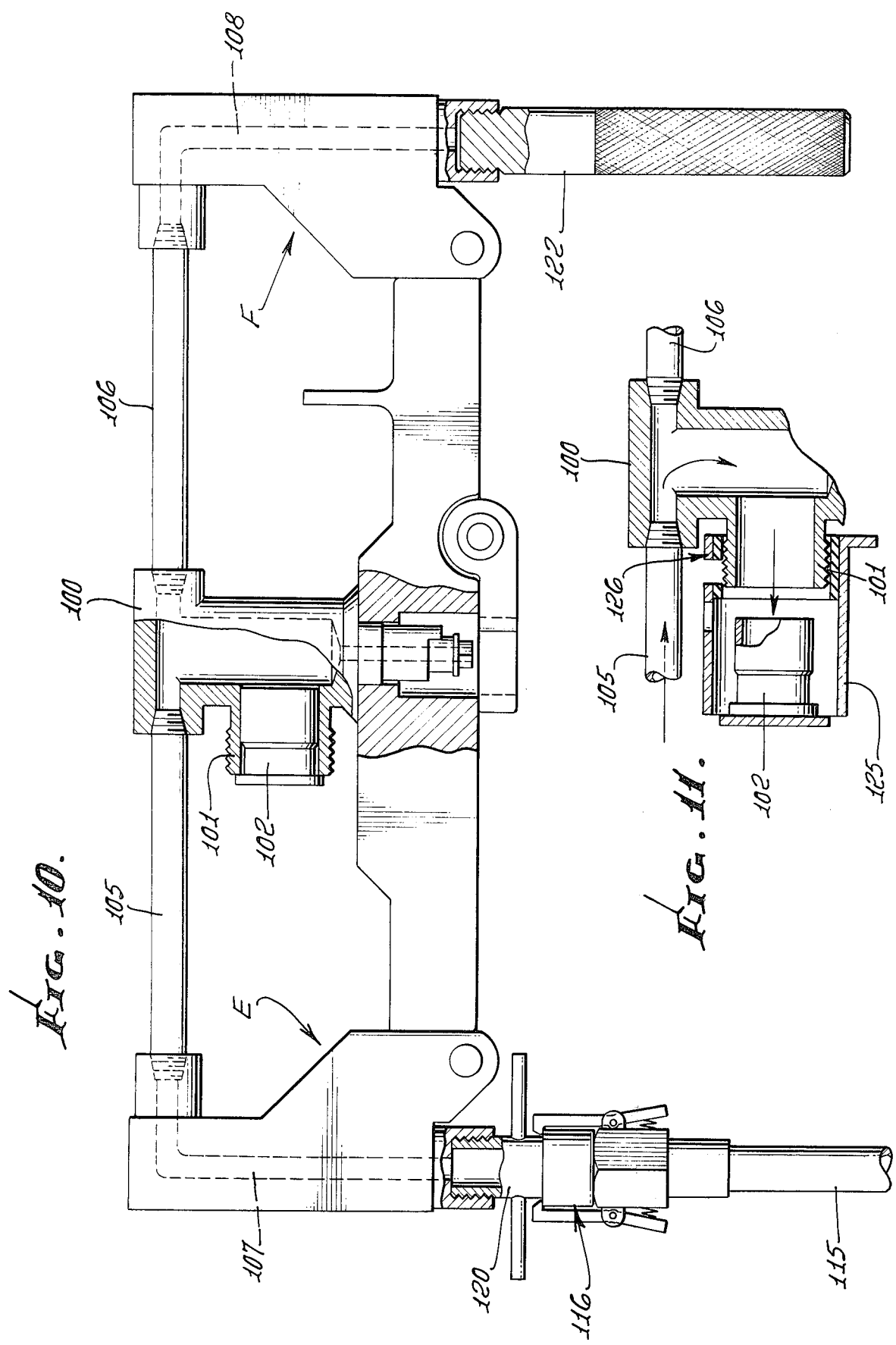

BREECH CARTRIDGE REMOVER

BACKGROUND OF THE INVENTION

In the release of bombs from military aircraft an explosive charge of gas from detonation of a cartridge is delivered through a breech gun to impel an ejector foot in order to eject the bomb through the slip stream so as to clear the aircraft.

The cartridges are normally thin walled soft metal and tend to expand tightly against the breech of the gun, sometimes virtually freezing in the breech and in any event becoming wedged therein.

This condition becomes more aggravated if there is a time delay between firing and removal of the cartridge when rust or corrosion may occur.

In order to reuse the guns, it is necessary of course to remove the expended cartridge, and as presently accomplished the task is arduous, time consuming, and dangerous.

The gun is taken from the bomb rack, and the present primitive method of removing the cartridge consists of sliding the gun barrel over a long spike mounted on a bench and pounding the cartridge against the end of the spike. This is not only a slow manual procedure, but is unreliable, and according to reports, on occasion has resulted in the operator's hand being punctured on the spike. Within the knowledge of applicant, this is the only method being practiced.

The slowness of the process, the personal risk involved, and sometimes a total failure to remove the cartridge, is detrimental to military procedures.

SUMMARY OF THE INVENTION

The primary object of the present invention is to provide an apparatus and method for efficiently, safely and reliably removing expended cartridges from breech guns, as for example, those used on United States Air Force Multiple and Triple Ejector Racks.

To accomplish this I provide a hydraulic system in a steel chamber within which the gun with its expended cartridge is temporarily secured, and by application of hydraulic pressure safely expel the cartridge within the chamber. The gun is easily inserted into the system and removed therefrom after removal of the cartridge.

The hydraulic system requires only low pressure tap water and a source of compressed air. The installation may be permanent, or portable by employment of a recirculating water source and a tank of compressed air or a simple power driven compressor.

Safety features are incorporated in the controls so that the operator's hands will be clear and out of the area where the cartridge is being removed.

I employ water as the hydraulic medium because it is satisfactory and is the least expensive, and ordinarily the most plentiful liquid available for the purpose. Also, its use does not necessitate any cleaning procedure on the gun prior to subsequent use. The water is delivered at ordinary low pressure from a tap to a pump where the water pressure is built up by operation of an air motor to a very high PSI, and the high pressure water is delivered through a conduit to a coupling to which the breech gun is temporarily interlocked. The water pressure moves through the barrel of the breech gun from the muzzle toward the breech, and the pressure against the cartridge expels the latter from the breech into the steel chamber.

During one experimental test of the invention about ten expended cartridges per minute were removed. On one occasion a breech gun which had been used the previous day was presented. The technicians were unable to remove the cartridge by the standard procedure described above under the heading "Background of the Invention". With the use of applicant's apparatus the expended cartridge was removed from the breech gun in approximately 14 seconds.

The apparatus can also be adapted in a form hereinafter described to remove expended cartridges from a new high speed multiple bomb ejector rack in which the gun is not removable but remains in place as a part of the rack.

BRIEF DESCRIPTION OF THE DRAWINGS

In the drawings:

FIG. 3 is a vertical sectional view taken on the line 3—3 of FIG. 1.

FIG. 4 is a vertical sectional view taken on the line 4—4 of FIG. 3.

FIG. 5 is an enlarged fragmentary section illustrating primarily the hydraulic coupling with gun interlocked therein.

FIG. 6 is a plan view taken on the line 6—6 of FIG. 5.

FIG. 7 is an elevational view taken on the line 7—7 of FIG. 5, with the gun separated from the other mechanism.

FIG. 8 is a section taken on the line 8—8 of FIG. 5.

FIG. 10 is an enlarged fragmentary view partly in section of the mechanism illustrated in FIG. 9.

FIG. 11 is a fragmentary section taken from FIG. 10 after the cartridge has been removed.

DESCRIPTION OF THE FIRST EMBODIMENT

Figure 1:
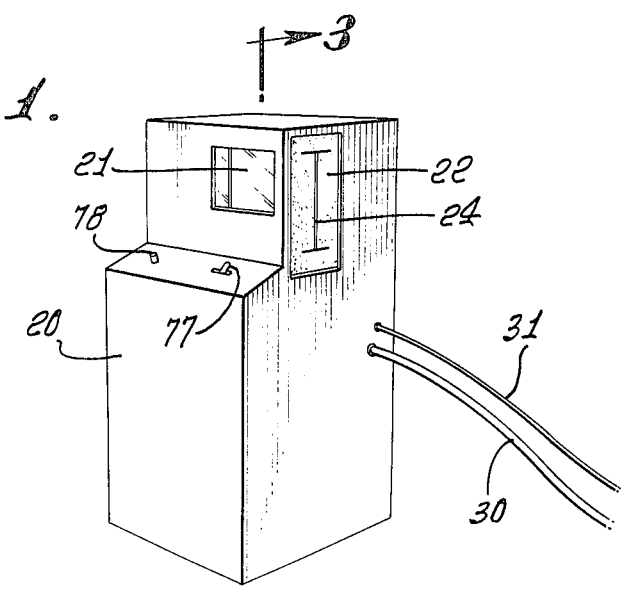
FIG. 1 is a perspective view of the apparatus as seen from the outside.

Referring to FIG. 1, the apparatus includes a cabinet 20, preferably made of steel or other hard metal, and includes a window 21 for observation which preferably utilizes a bullet-proof type glass, and an access entrance 22 for inserting and withdrawing the gun 23. This access entrance is shown as comprising a flexible tough sheet material such as a thick plastic with a vertical slit 24 which may be manually parted for the operator to reach through to connect or disconnect the gun 23.

The hydraulic system includes a hydraulic liquid source 30 which, by way of example and not of limitation, is shown as a low pressure tap water line; and an air pressure line 31 wherein, by way of example and not of limitation, 100 PSI air source is satisfactory. The water source is introduced into an air-driven hydraulic pump 35.

This pump is well known equipment, is illustrated generally schematically, and will be described only briefly. It comprises a housing 36 with a drive piston 37 of large diameter moved by air pressure, and a driven piston 39 of small diameter acting upon the water. The differential in the areas of the piston multiplies the PSI of the water, creating very high pressure in hydraulic line 38. A suitable pump, available as an article of commerce, is illustrated in Teledyne Sprague Engineering Bulletin No. 255, for example "S-216C-Basic Pump".

The line 38 is connected to a coupling 40. The latter is adapted from an ejector foot housing in the bomb rack. It is securely mounted by a bracket 41 to the structure of the cabinet, as indicated at 42 in FIG. 3. This coupling 40, shown in greater detail in FIG. 5, has an elbow configuration which is threadedly engaged at its end 43 with the terminal end of high pressure line 38. Fluid passage 45 in the coupling communicates between the high pressure line 38 and a chamber 46 in the vertical section of the coupling.

This chamber 46 is annular in cross section and has a diameter which will slidingly receive the muzzle end 47 of the breech gun 23. The chamber 46 at its lower region expands into a retention chamber 48 of greater diameter, the junction between the two portions presenting a tapered shoulder 49. The retention chamber terminates with diametrically opposite shoulders 52 below which is a flared entrance 53.

The barrel 56 of the breech gun is formed near the muzzle end thereof with an annular groove 58 in which is disposed a resilient sealing ring 59. This is in C-ring form, and functions like a piston ring. Rearwardly of the ring 59 is a flange 62 of special configuration. This flange, as seen in FIG. 8, is oblong in a direction normal to the axis of the barrel 56. Its smaller diameter is such as to readily slide through the entrance 53 when turned so that the side walls 60 representing the smaller diameter are turned parallel to the shoulders 52 between the retention chamber 48 and the entrance 53. With these relative positions the barrel can be pushed up into the coupling 40 until the flange 62 enters the retention chamber 48. The barrel is then rotated approximately 90° so that the ends 63 defining the larger diameter of the flange 62 overlie the shoulders 52 in the coupling (as seen in FIG. 8). This locks the barrel in the coupling, as shown in FIG. 5.

The expended cartridge 70 is lodged in the breech of the gun.

The connection of the gun with the coupling is conveniently achieved by manually introducing the gun through the slit 24, pushing it into the entrance 53 with the correct orientation of the flange 62 and then rotating the gun so that it is locked in the coupling. During insertion the sealing ring 59 is contracted by the tapered shoulder 49 and it then expands against the wall of the chamber 46. The operator withdraws his hand and actuates the hydraulic system.

Figure 2:
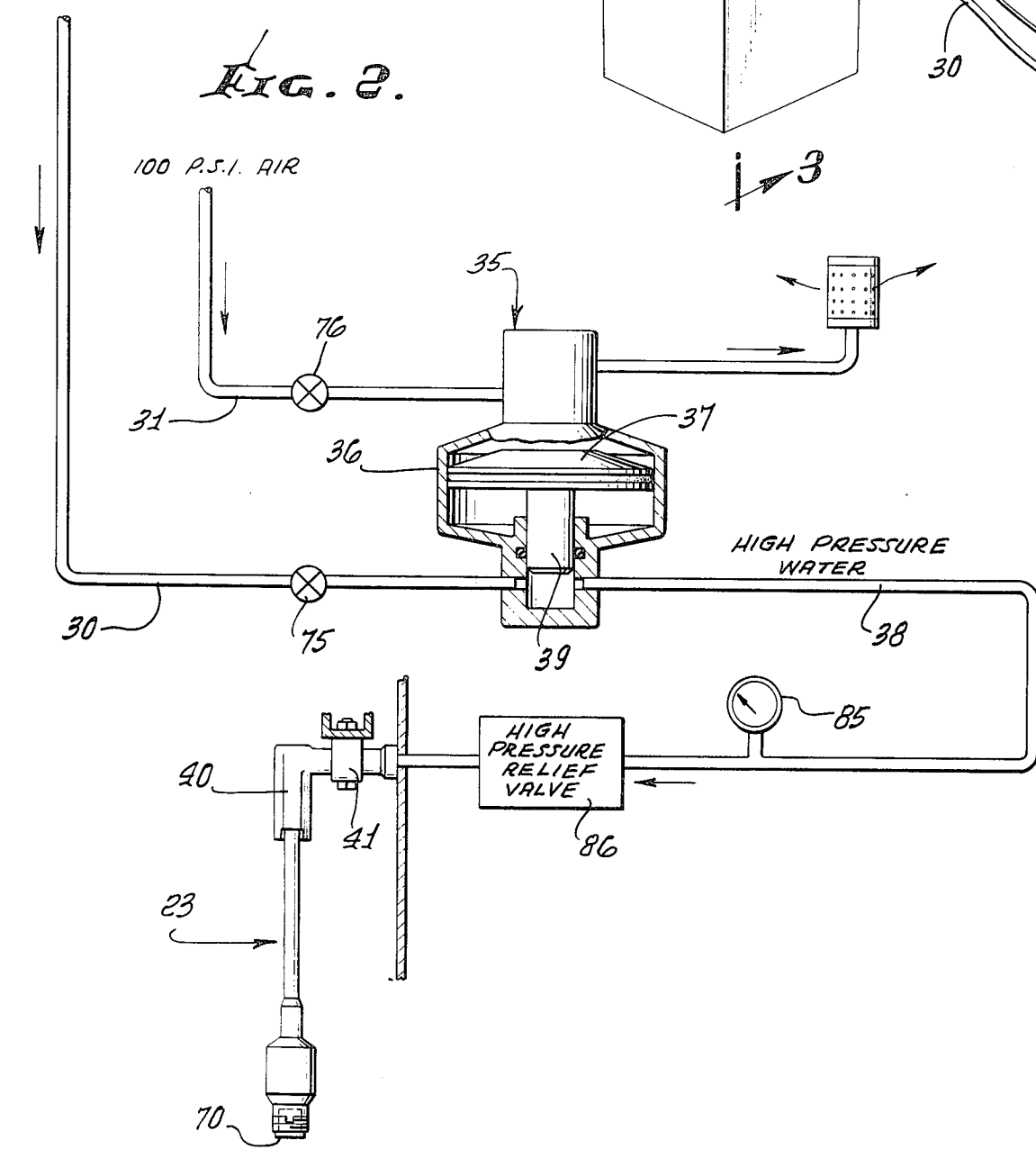
FIG. 2 is a diagrammatic illustration of the mechanism contained within the cabinet of FIG. 1 and showing a breech gun inserted for cartridge removal.

This is shown schematically in FIG. 2 as controlled by a water line valve 75 and an air valve 76 which are located inside the cabinet. They are manual push button, spring return type valves, of well known design, and are operated by push buttons 77 and 78 accessible externally of the cabinet. These are spaced far enough apart, as illustrated in FIG. 1, that they cannot be simultaneously reached with the fingers of one hand. Thus it becomes necessary for the operator to use both hands to operate the push buttons, and consequently neither of his hands will be inside the cabinet when actuation occurs.

With both valves 75 and 76 opened, the air pressure acting on the drive piston which exerts force on the driven piston builds up the required high pressure, and the water pressure through line 38 is introduced through the coupling and gun barrel into and against the expended cartridge 70, with the resulting expulsion of the cartridge.

It is preferable to locate the coupling 40 within a compartment 80 (see FIG. 3) set off from the hydraulic pump and communicating with a chute 81 slanting downwardly, with a partial lining of a cushioning material 82, ending with an opening 83 disposed over a collector bin 84.

The operator will know by a drop in pressure, indicated by a gauge 85, or by visual observation through the window 21, when the ejection has been completed, and will close the valves 75 and 76 by release of the push buttons 77 and 78.

It is desirable to incorporate a high pressure (bleed off) relief valve 86 in the line 38.

SECOND FORM OF THE INVENTION

Figure 9:
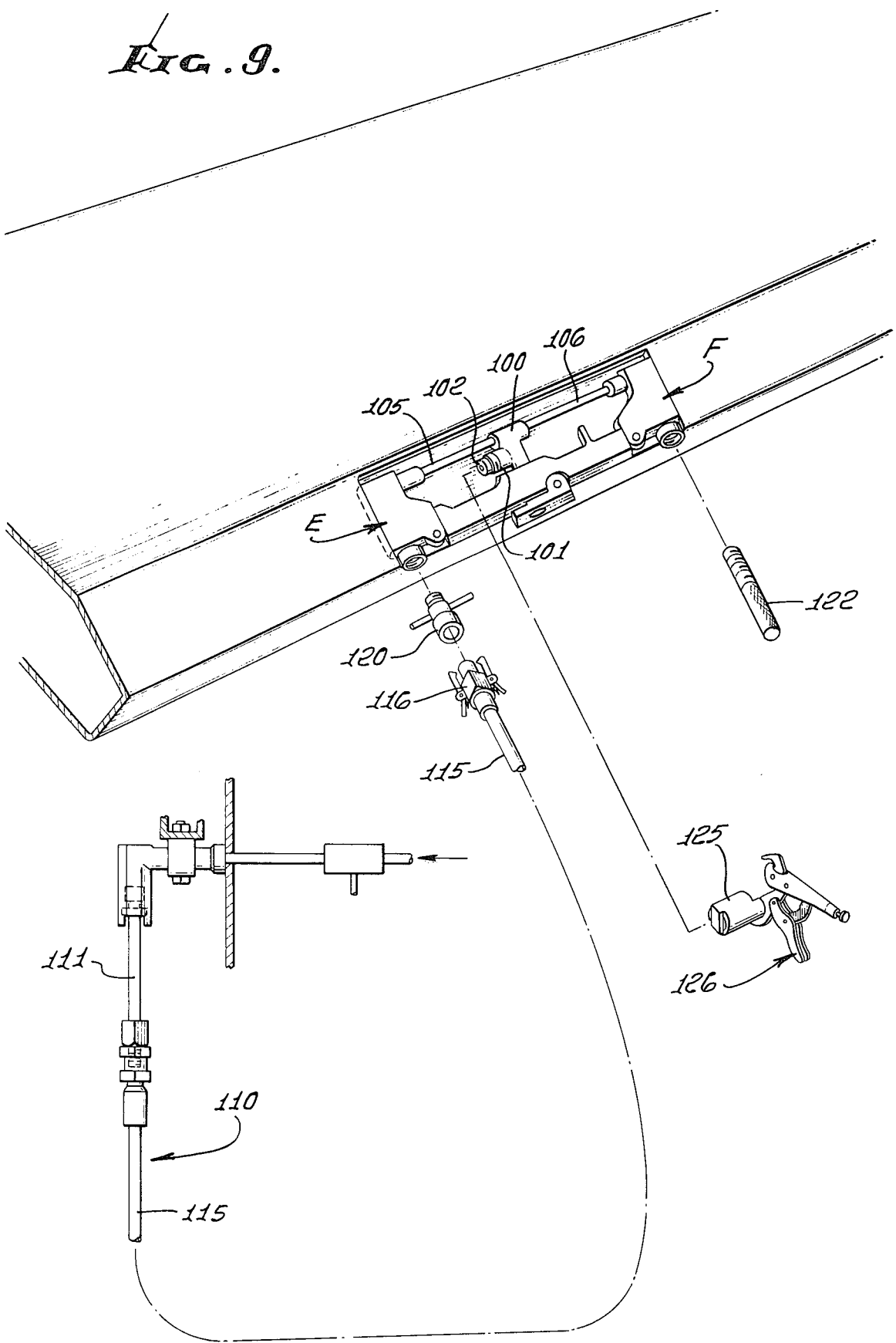
FIG. 9 is a perspective view, partly schematic, of a modified system for employment on a bomb rack where the ejector gun is a permanent part of the rack.

In certain forms of bomb racks, such as partially illustrated in FIGS. 9, 10 and 11, which are designated by the United States Air Force as BRU 3A/A, and which are ordinarily mounted on the wings of the aircraft, the ejector mechanism, which is a permanent part of the bomb rack, includes a T member 100 with a breech 101 which receives cartridge 102. Extending in both directions from the T 100 are tubes 105 and 106, the outer ends of which are connected with elements E and F, respectively, formed with passageways 107 and 108. The T 100, the tubes 105 and 106, and the passages 107 and 108 take the place of the breech gun in the form first described.

For removing the expended cartridge in this presently described bomb rack system, I utilize the same hydraulic system as first described, and provide a remote hydraulic communication 110 for convenient access to the bomb rack.

The system 110 includes a rigid nipple 111 which may have a connector end similar to the muzzle end portion of the breech gun 23. I connect a flexible high pressure hose 115 to the nipple 111 and provide a quick connect fitting 116 at the free end of the hose 115.

An adapter 120 may be threaded into the lower end of the passage 107 in element E and a stop member 122 may be threaded into the lower end of passage 108 in element F.

Thus, upon operation of the hydraulic system, as heretofore described, pressure introduced through the hose 115 and ultimately through the T 100 against the expended cartridge 102 will eject the latter.

In order to avoid indiscriminate discarding of the spent cartridge, I may conveniently employ a capsule type catcher 125 temporarily held on the breech 101, by a toggle clamp 126, as shown in FIG. 11. The toggle clamp preferably is a part of the catcher, as illustrated in FIG. 9.

Although I have described my invention in what I have conceived to be the preferred embodiments, it is recognized that departures may be made therefrom within the scope of my invention.

I claim:

1. Apparatus for removing expended cartridges from removable breech guns of bomb racks comprising a source of hydraulic power, a coupling member with an intake end connected to the hydraulic power source and an outlet end including means for releasably interlocking a forward end of the breech gun therein, said gun being adapted to have an expended cartridge in the rearward end thereof, the coupling member providing communication between the hydraulic power source and the forward end of the breech gun to deliver liquid under pressure against the interior end of the cartridge in said rearward end.

2. Apparatus as defined in claim 1 which includes a cabinet formed with compartments, the source of hydraulic power is an air driven hydraulic pump mounted in one compartment, the coupling member is mounted in another compartment, and a line communicates between the pump and the intake end of the coupling member.

3. Apparatus as defined in claim 2 in which the coupling member is an elbow and the outlet end thereof opens downwardly, and the cabinet includes a heavy curtain formed with a partable slit adapted to be manually opened for introduction of the breech gun into the compartment where the coupling member is located.

4. Apparatus as defined in claim 3 wherein separate valve controls are provided for air and liquid delivered to the hydraulic pump, said controls having manually operable elements protruding from the cabinet and spaced apart a distance too great to be simultaneously grasped by one hand.

5. Apparatus as defined in claim 2 which includes an inspection window in the cabinet providing visibility to the compartment in which the coupling member is mounted.

6. Apparatus for removing expended cartridges from breeches of bomb rack explosive ejector devices comprising an air driven hydraulic pump providing a source of hydraulic power, coupling means providing communication between the hydraulic source and the forward end of a breech, said coupling means including a flexible high pressure conduit and an adapter for removably connecting to the forward end of the breech, and said breech being adapted to have a cartridge in the rearward end thereof, said coupling means being adapted to deliver liquid under pressure from the hydraulic pump to against the interior end of the cartridge.

7. Apparatus as defined in claim 6 which includes a cartridge catcher releasably secured upon the breech at the region where the cartridge is removed.

* * * * *